April 22, 1924.
G. H. EKSTROM
1,491,523
ADJUSTABLE DRILLING AND BALANCING TOOL
Filed July 26, 1919    2 Sheets-Sheet 2
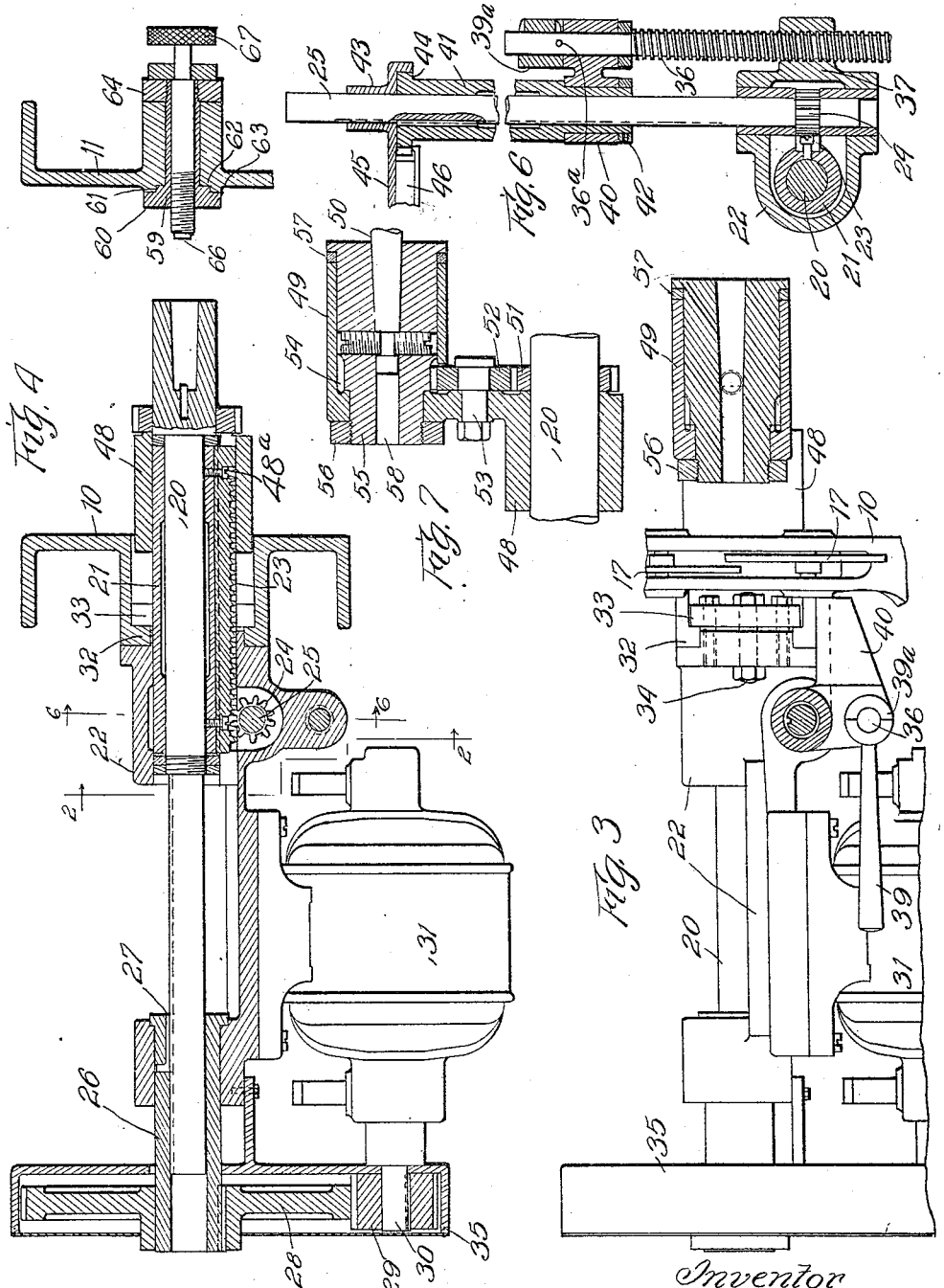
Inventor
Gustaf H. Ekstrom
By Miller Chindahl Parker
Attys Patented Apr. 22, 1924.

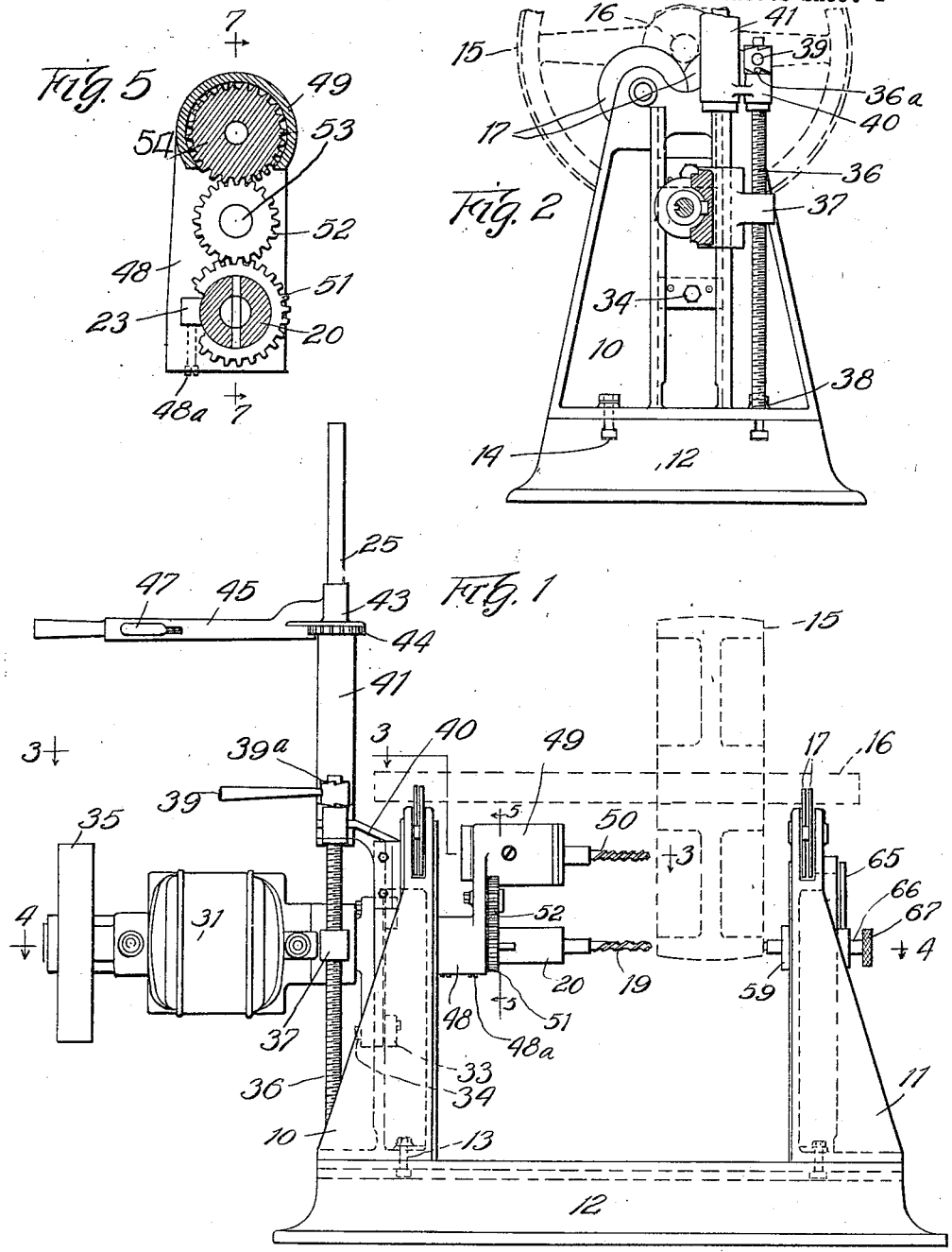

1,491,523

UNITED STATES PATENT OFFICE.

GUSTAF H. EKSTROM, OF ROCKFORD, ILLINOIS, ASSIGNOR TO ROCKFORD TOOL COMPANY, OF ROCKFORD, ILLINOIS, A CORPORATION OF ILLINOIS.

ADJUSTABLE DRILLING AND BALANCING TOOL.

Application filed July 26, 1919. Serial No. 313,488.

*To all whom it may concern:*

Be it known that I, GUSTAF H. EKSTROM, a citizen of the United States, residing at Rockford, in the county of Winnebago and State of Illinois, have invented certain new and useful Improvements in Adjustable Drilling and Balancing Tools, of which the following is a specification.

My invention relates to devices for balancing the rotating parts of machinery by removing material, and more specifically to an improved stand and drilling machine on which the part to be balanced may be mounted in a suitable manner to determine which side is heaviest, that side being then lightened while the part remains in place.

One object of my invention is to provide in connection with a machine of the general character above referred to, means for removing material close to the axis of the element. For this purpose I have provided a supplementary drill head driven from the main drill head and offset toward the axis of rotation of the part to be balanced.

Further objects and advantages of my invention will become apparent as the description proceeds.

In the accompanying drawings, Figure 1 is a side elevation and Fig. 2 is a partial section on the line 2—2 of Fig. 4 of a machine embodying my invention. Fig. 3 is a horizontal sectional view partly broken away of the power end of the machine on the line 3—3 of Fig. 1. Fig. 4 is a horizontal section on the line 4—4 of Fig. 1. Fig. 5 is a detail section on the line 5—5 of Fig. 1. Fig. 6 is a vertical section on the line 6—6 of Fig. 5 and Fig. 7 is a detail section on the line 7—7 of Fig. 5.

In the embodiment of my invention selected for illustration, a pair of main standards 10 and 11 are slidably adjustable toward and away from each other on the base 12 and may be clamped in position by any suitable means such as bolts 13 having square heads sliding in the T-slots 14. The part or piece of work to be balanced, indicated in dotted lines at 15, is first mounted on a suitable axle 16 and then laid over and supported by two pairs of wheels, one pair in the top of each standard, having laterally spaced parallel axes of rotation. As shown in Fig. 2, the wheels 17 support the axle 16 so that it is free to rotate by rolling on them. The wheels themselves are preferably mounted on ball-bearings to aid in reducing friction. By turning the part 15 through small angles, the direction in which it is out of balance can be readily determined.

Means are provided for drilling holes in the part 15 to lighten it on the heavy side, either at its periphery or farther up adjacent its axis. I have shown a drill 19 carried in a rotatable spindle 20 and suitable power means for driving the drill. The spindle 20 is carried by a sleeve 21 (see Fig. 4) which may be slid horizontally through the frame 22 by means of a rack 23 fastened to one side of it meshing with a pinion 24 on a vertical shaft 25. The spindle 20 projects beyond the sleeve 21 into a second sleeve 26 to which it is slidably splined as indicated at 27. The sleeve 26 receives power through gears 28 and 29 from the armature shaft 30 of a suitable motor 31. The spindle 20, motor 31 and power transmission between the two are all mounted on the unitary frame 22 which is vertically slidable on ways 32 formed on the standard 10 and may be clamped in adjusted position by suitable clamping means such as plates 33 engaged by clamping bolts 34. A casing 35 encloses the gears 28 and 29 to keep out the dirt and also to protect the operator of the machine from injury. The means for vertical adjustment of the drill spindle and its motor comprise a vertical screw 36 threaded through a projecting lug 37 on the frame 22 adjacent the ways 32. The screw 36 rests in a suitable bearing 38 on the standard 10 and may be rotated by a suitable hand lever 39 to raise and lower the drill and motor. The upper end of the screw 36 is journaled in a bracket 40 projecting from the standard 10. The hand lever 39 terminates in a sleeve 39[a] having ratchet teeth adapted to engage a pin 36[a] in the shaft 36. This is necessary because the adjacent parts prevent rotation of the lever through an entire circle. In the position illustrated in Figs. 1 and 2 the sleeve is operative to lower the frame 22. To turn the screw 36 in the opposite direction the sleeve is simply lifted off the end of the screw, turned over and put back on. The ratchet teeth on the side then lowermost will be operative to engage pin 36[a] and raise the frame.

Means are provided for sliding the spindle 20 by means of the pinion 24 in any position of vertical adjustment of the spindle.

I have shown an upwardly extending sleeve 41 rotatably mounted in the bracket 40 and fastened in place by a suitable collar 42 through which the shaft 25 extends and to which the said shaft is splined. A cap 43 rotatable on the shaft 25 and resting on the upper end of a toothed wheel 44 formed at the upper end of the sleeve 41, carries a radially projecting tubular lever arm 45 in which is slidably mounted a locking member 46 controlled by a suitable hand grip 47. It will be seen that upon vertical adjustment of the drill spindle and motor, the shaft 25 will slide to a new position in the sleeve and in any position manual power may be applied to the lever 45, through the shaft 25, pinion 24 and spindle 20, to force the drill into the work.

Additional means for drilling lightening holes close up to the axis of the member to be balanced are provided comprising a bracket 48 rigidly mounted on the sleeve 21 and extending upwardly therefrom to support an auxiliary drill head 49 carrying the auxiliary drill 50. The mounting means includes a keyway receiving the rack 23 as shown in Fig. 5, and locking screws 48ª engaging rack 23 to prevent axial sliding thereof. The rack 23 therefore functions both as a rack for feeding the spindles and as a key for the bracket 48. A suitable power transmission to the drill 50 comprises the gear 51 mounted on and rotated by the spindle 20 and meshing with an intermediate gear 52 suitably mounted on a bolt 53, which intermediate gear meshes with gear 54 on the spindle 55 carrying the auxiliary drill 50. As clearly illustrated in Fig. 7, the spindle 55 is rotatable in the head 49 and suitably restrained from longitudinal sliding by the locking member 56 and the collar 57. A suitable hole is provided at 58 in the rear end of the spindle 55 for the insertion of a knock-out rod to assist in removing the drill 50.

To hold the part 15 against the end thrust of one or both of the drills 19 and 50, an adjustable stop is provided in the standard 11. As shown in Figs. 1 and 4, this stop comprises a tubular casing 59 having annular enlargements 60 and 61 at its inner end, engaging shoulders 62 and 63 which consitute guideways for the member, said casing being suitably threaded into a locking collar 64 carrying a suitable hand lever 65. The casing may thus be slid to any desired vertical elevation in the guides 62 and clamped in position by means of the hand lever 65. A stop rod 66 rotatable by means of knurled wheel 67 is threaded through the casing 59 and may be adjusted to project into abutting engagement with any desired portion of the part 15 to receive the end thrust of one or both of the drills 19 and 50.

It will be seen that I have provided a machine on which the element to be balanced can be mounted and tested for balance and in which the lack of balance can be immediately corrected by means of the adjustable drills 19 and 50 without it being necessary to move the element. After some material has been removed by the drills, they may be withdrawn and the element may be immediately tested for balance to determine the effect of the operation already performed. The material may be removed near the periphery, or near the hub, or in both places simultaneously. A much more delicate adjustment of balance is manifestly obtainable by removing material near the hub, as the material removed has a smaller moment arm.

While I have shown and described in detail one specific embodiment of my invention, it should be clearly understood that the description is only for purpose of illustration and that many improvements and modifications will naturally occur to those skilled in the art. I aim in the subjoined claims to cover all such legitimate modifications and improvements.

I claim as my invention:

1. A drilling and balancing tool comprising, in combination, a pair of standards, means on the standards for rotatably supporting the part to be balanced, one of said standards being provided with a vertical guideway, a bearing bracket mounted for vertical adjustment in said guideway, a drill spindle mounted in said bracket, a motor carried by the bracket and arranged to actuate said spindle, an extension bracket on said spindle and an auxiliary drill spindle carried by said extension bracket and having a gearing connection with the main spindle.

2. A drilling and balancing tool comprising, in combination, a pair of standards, means on the standards for rotatably supporting the part to be balanced, a drill adapted to be supported in vertically adjusted position on one of said brackets, means for driving said drill, an auxiliary drill rotatable on an axis parallel to said first mentioned drill but laterally spaced therefrom, connections between said drills whereby they are both simultaneously driven and means for simultaneously feeding said drills into the work.

3. The combination recited in claim 2, in combination with an adjustable stop carried by the other of said standards adapted to rest in abutting relation with the element to be balanced on that side of the latter remote from the drills but in line therewith to resist the end thrust due to the operation of said drills and prevent movement of said element particularly with said drills in the direction of feed of the latter.

4. In a device of the character described the combination of a vertically adjustable member, a sleeve mounted in said member for horizontal movement, a tool spindle journalled in said sleeve, an upright shaft having a gearing connection with said sleeve operable in any position of vertical adjustment of said member to actuate said sleeve, a bracket carried by said sleeve, and a second spindle mounted in said bracket and operatively connected with the first spindle.

5. In a device of the character described the combination of a vertically adjustable member, a sleeve mounted in said member for horizontal movement, a tool spindle journalled in said sleeve, and an upright shaft having a gearing connection with said sleeve operable in any position of vertical adjustment of said member to actuate said sleeve, said shaft being movable vertically with said sleeve and having an operating device connected therewith to permit of relative longitudinal movement therebetween.

6. In a device of the character described the combination of a vertically adjustable member, a sleeve mounted in said member for horizontal movement, a tool spindle journalled in said sleeve, a bracket carried by said sleeve, a second spindle journalled in said bracket, and means for rotating said spindles.

7. In a device of the character described the combination of a standard, a member mounted for vertical adjustment upon said standard, a feed screw operable to vary the height of said member, a tool spindle journalled in said member, and means for adjusting said spindle laterally irrespective of the position of said member including a vertical shaft having an operative connection with the spindle, and a lever arm having an operative connection with the shaft.

In testimony whereof, I have hereunto set my hand.

GUSTAF H. EKSTROM.